ized Patent [19]

Sawyer

[11] 4,081,406
[45] Mar. 28, 1978

[54] PREPARATION OF CATALYSTS OF PREDETERMINED PORE SIZE DISTRIBUTION AND PORE VOLUME

[75] Inventor: Willard H. Sawyer, Baton Rouge, La.

[73] Assignee: Exxon Research & Engineering Co., Linden, N.J.

[21] Appl. No.: 745,429

[22] Filed: Nov. 26, 1976

Related U.S. Application Data

[63] Continuation-in-part of Ser. No. 646,490, Jan. 5, 1976, Pat. No. 4,016,106, and a continuation-in-part of Ser. No. 646,491, Jan. 5, 1976, Pat. No. 4,016,107.

[51] Int. Cl.² .................... B01J 21/04; B01J 21/12; B01J 23/64; B01J 23/84
[52] U.S. Cl. ................ 252/455 R; 252/465; 252/466 J; 252/466 PT
[58] Field of Search .......... 252/455 R, 465, 466 J, 252/466 PT; 423/628

[56] References Cited
U.S. PATENT DOCUMENTS 3,900,427  8/1975  Riley et al. .................. 252/465 X Primary Examiner—W. J. Shine
Attorney, Agent, or Firm—Llewellyn A. Proctor

[57] ABSTRACT

An improved process for the production of catalysts comprised of a metal hydrogenation component, or components, composited with high pore volume alumina, with pores of narrow pore size distribution, wherein macropore volume is drastically reduced by improved extrusion techniques. An alumina hydrogel paste is extruded through a die to form spaghetti-like extrudate shapes by application of sufficient torque, suitably from about 25 to about 55 inch-pounds, preferably from about 40 to about 50 inch-pounds, to eliminate much of the macropore volume, i.e., pores greater than 400A, which greatly improves the activity maintenance of the catalyst. The extrudates can, if desired, be shaped into other forms, suitably spheres. The improved process also embodies a technique for increasing the intrinsic activity of these and other catalysts by special impregnation techniques which provides better dispersion of the metal hydrogenation component, or components, throughout the catalyst.

30 Claims, 1 Drawing Figure

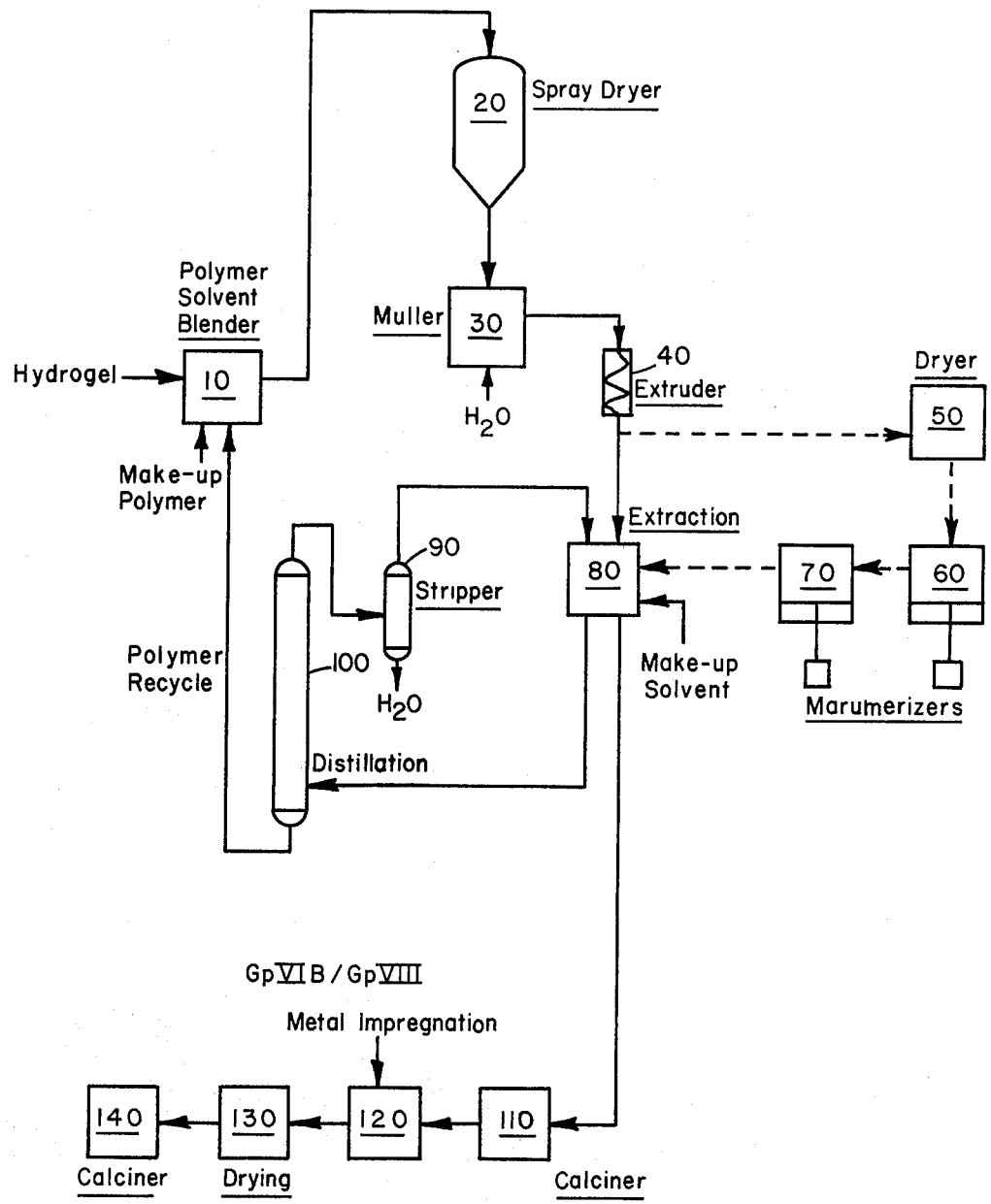

PREPARATION OF CATALYSTS OF PREDETERMINED PORE SIZE DISTRIBUTION AND PORE VOLUME

RELATED APPLICATIONS

This is a continuation-in-part of application Ser. Nos. 646,490 and 646,491 by Willard H. Sawyer, et al, filed Jan. 5, 1976, now U.S. Pat. No. 4,016,106 and U.S. Pat. No. 4,016,107 issued on Apr. 5, 1977 herewith incorporated by reference. Reference is also made to now Ser. No. 646,492, filed on even date herewith, to which the instant Application is related.

Processes for the preparation of synthetic forms of alumina for use in catalytic processes have been known for many years. Albeit alumina can be so prepared in very pure form, at controlled conditions to provide particular characteristics not possessed by natural alumina, few processes are available for the formation of alumina of preselected, or controlled, large pore size distribution with high pore volume, particularly high pore volume alumina with large pores of narrow pore size distribution.

U.S. Pat. Nos. 3,977,961 and 3,977,962 which issued Aug. 31, 1976, e.g., describes the preparation of catalysts from alumina formed by the neutralization of an aluminum salt solution with ethylene oxide at controlled conditions. These catalysts are characterized as having properties inclusive of a large number of pores in the 100–275A (Adsorptomat) pore size diameter range, and very high pore volume. They have proven particularly useful in the production of clean liquid products by the hydroconversion of the 1050° F. + materials contained in unconventional heavy crudes and residua, which materials are particularly difficult to treat because they have (1) very high Conradson carbon (i.e., "Con carbon") or carbon-hydrogen ratios (i.e., relatively high carbon and low hydrogen content), (2) very high metals content, particularly as regards the amount of nickel and vanadium, (3) an ultra-high content of materials boiling above 1050° F., e.g., asphaltenes, and (4) contain considerable amounts of sand and scale.

Despite the admirable success of these catalysts, it was nonetheless felt that yet better activity, and improved activity maintenance were desirable. Moreover, albeit the ethylene oxide neutralization method for the preparation of these catalysts was acceptable, certain difficulties made it desirable to find a commercial alternate for the production of these catalysts. One problem that favored the development of an alternate process was that ethylene chlorohydrin, a very hazardous chemical, was evolved as a by-product in the ethylene oxide neutralization process. The elimination of this hazard required additional treating facilities, which proved to some degree a burden on the process. Equally as important, a strict process regimen was required to produce the most active catalysts. This too, to some degree, proved a burden cumulative with the former. The desire thus arose for an alternate process.

It was then discovered that high pore volume, large pore catalysts could be produced by a new and improved polymer extension technique as disclosed and claimed in pending application Ser. Nos. 646,490 and 646,491 by Willard H. Sawyer et al., now U.S. Pat. Nos. 4,016,106 and U.S. Pat. No. 4,016,107, respectively and application Ser. No. 646,492 by Harry E. Robson, now U.S. Pat. No. 4,016,108 which issued Apr. 5, 1977. The disclosed process of Sawyer et al and Robson is an improvement over an earlier method for the preparation of large pore catalysts wherein alumina of pore volume ranging from about 20A to 20,000A diameter, and higher, is prepared by the addition of a wide number of water soluble organic polymers ranging from low molecular weight to very high molecular weight materials, either dissolved in the solution used to prepare the gel or dissolved or dispersed within the hydrous mass of gel after it has been precipitated. This method, and the disclosure generally of alumina precipitation from aqueous alkaline solutions, supra, is disclosed in U.S. Pat. No. 3,417,028. Reference is also made to the Journal of Catalysis, Vol. I, Pages 547–563 [1962], "The Control of the Pore Volume and Pore Size Distribution in Alumina and Silica Gels by the Addition of Water-Soluble Organic Polymers," by Z. Basmadjian, G. N. Fulford, B. I. Parsons, and D. W. Montgomery.)

The polymer extension method disclosed by Sawyer et al and Robson requires as its starting point the precipitation of a hydrous form of alumina from solution by adding to an aqueous alkaline aluminate solution a quantity of an inorganic acidic compound having an anion that forms an aluminum salt that is soluble in an alkaline solution. For example, a solution of aluminum oxide trihydrate dissolved in a strong alkali, e.g., NaOH, added to a mineral acid or the aluminum salt of a strong mineral acid, e.g., $Al_2(SO_4)_3$, such that at the end point the solution is at pH ranging from about 8 to 12, generally from about 9 to 10, causes the precipitation of a hydrous form of alumina from solution. Whereas this technique per se, and an earlier polymer extension process, supra, for forming alumina were known to the prior art, the polymer extension method of Sawyer et al and Robson differed drastically therefrom, inter alia, in that high pore volume alumina, with pores of narrow pore size distribution, could be formed by adsorption into the pores of the alumina hydrogel specific concentrations of water soluble polymers containing from 2 to about 24 monomer units from the group consisting of (a) polyethylene glycols, (b) polypropylene glycols, and (c) polyethylene amines. In contrast to the polymer extension process of Sawyer et al and Robson, inter alia, most of the pore volume of the alumina prepared by the earlier polymer extension method was in the range of 1000A diameter or greater, with no means for concentrating pore volume in any particular range, much less within a narrower range of pore sizes. Moreover, the polymers used as pore volume extenders in the earlier polymer extension process were consumed in the calcination step and hence, due to the cost of the polymer, the process was necessarily debited; and further the smoke and fumes produced on burning the polymer during calcination created additional burdens on the process.

The process disclosed in said Sawyer et al. and Robson patents, in any event, though admirably suitable for the production of high pore volume alumina, with pores of narrow pore size distribution, is nonetheless susceptible of further improvement. Thus, though many of the problems associated with the ethylene oxide process are eliminated, the catalyst produced in this process are not consistently as active, or possessed of as high activity maintenance, as thos produced in the ethylene oxide process. This process too, like the ethylene oxide process, also requires a too carefully controlled regimen of the conditions of operation to produce the most active catalyst species. Further improvements in the polymer extension process are therefore yet desirable.

A primary objective of the present invention, therefore, is to supply this need.

A particular object is to provide further improvements in polymer extension processes, particularly the polymer extension process of Sawyer et al and Robson, and to make such process yet more useful in the preparation of catalysts suitable for hydrocarbon conversion reactions, especially reactions involving the hydroconversion of the 1050° F+ hydrocarbon portion of heavy crudes and residua.

A further specific object is to supply a new and improved polymer-extension process, particularly one suitable for the preparation of catalysts useful in converting the 1050° F.+ hydrocarbon portion of feeds comprising heavy crudes and residua to useful lower boiling products while simultaneously producing appreciable Conradson carbon (Con carbon) reduction, hydrodesulfurization, hydrodenitrogenation and demetallization of the feeds.

A yet further and yet more specific object is to provide a process by virtue of which the hydrodesulfurization activity, hydrodesulfurization activity maintenance, and demetallization activity of catalysts produced by the polymer extension process of Sawyer et al and Robson and others can be further increased.

These and other objects are achieved pursuant to the practice of the invention which relates to improvements in a process for the treatment of a hydrogel by contact thereof with an aqueous solution containing from about 10 to about 20 percent, preferably from about 15 to about 20 percent, by weight, of a water soluble polymer containing from 2 to about 24, preferably from about 4 to about 8 monomer units, from the group consisting of (a) polyethylene glycols, (b) polypropylene glycols, and (c) polyethylene amines, sufficient to add said polymer to the hydrogel in polymer:alumina concentration ranging from about 0.5:1 to about 4:1, preferably from about 1:1 to about 2:1, to develop large pores, of relatively narrow pore size distribution, subsequent to which the alumina hydrogel is dried, formed into a paste of proper extrusion consistency and the paste then extruded through a die to form spaghetti-like extrudate shapes by application of sufficient torque, suitably from about 25 to about 55 inch pounds, preferably from about 40 to about 50 inch pounds, to eliminate much of the macropore volume, i.e., pores greater than 400A (i.e., 400A+) and thereby improve the activity maintenance of the catalyst.

The process also embodies a technique for increasing the intrinsic activity of these and other catalysts by special impregnation techniques which provides better dispersion of the metal hydrogenation component, or components, throughout the catalyst.

In a preferred embodiment the process involves the following steps:

1. Alumina, as a hydrogel, is precipitated from an alkaline solution at a pH ranging from about 8 to 12, preferably 9 to 10, by adding to a hydrous form of alumina in aqueous alkaline solution, an inorganic acid or aluminum salt of an inorganic acid consititued in part of an anion soluble in an alkaline medium. The alumina is normally precipitated by combining solutions, (a) a first of which contains an alkali metal aluminate, e.g., $NaAlO_2$, and (b) a second of which contains a strong mineral acid or an aluminum salt of a strong mineral acid, the anion portion of which is soluble in an alkaline solution, e.g., $Al_2(SO_4)_3$. Silica can be added, if desired, to ultimately produce a "glassy" alumina or to increase the resistance of the catalyst to sintering. The temperature of precipitation ranges generally from about 15° F. to about 120° F., and preferably from about 32° F. to about 70° F. Suitably, the concentration of alumina contained within the sum-total of the solution ranges from about 1 to about 5 weight percent, preferably from about 2 to about 3 weight percent.

2. The precipitated alumina hydrogel, a microcrystalline substance, in a gel matrix, ranging from about 30A to about 40A in crystallite size, is preferably washed with water or aqueous solution suitably at ambient temperature or temperature or temperatures ranging from about 70° F. to about 85° F., to remove essentially all of the soluble salt, e.g., $Na_2SO_4$. The removal of a large part of the sulfate from the alumina hydrogel is essential to achieve high surface area and good catalytic activity in the finished catalyst, and preferably essentially all of the sulfate is removed from the hydrogel.

3. In a pore volume extending step, a "pore volume extending" agent comprising a water-soluble polymer containing from about 2 to about 24 monomer units, preferably from 4 to about 8 monomer units, from the group consisting of (a) polyethylene glycols, (b) polypropylene glycols, and (c) polyethylene amines is then added to the partially washed hydrogel, suitably during the washing step, or the hydrogel further contacted or washed with a solution of the polymer. In either event, the hydrogel is contacted with an aqueous solution containing from about 10 weight percent to about 20 weight percent, and preferably from about 15 weight percent to about 20 weight percent of the polymer, such that the polymer solution is absorbed into the pores of the hydrogel. Suitably, the hydrogel is contacted or washed at ambient temperature, or at a temperature ranging from about 70° F. to about 85° F.

The final pore volume, and pore volume distribution, of the finished alumina is principally determined by the amount of polymer, or pore volume extender, added to the hydrogel during the pore volume extending step. In contacting or washing the hydrogel, the water within the hydrogel is displaced by polymer solution, and the more concentrated the polymer within the solution the greater the amount thereof which can be exchanged into the hydrogel. Preferably, the water is displaced until the weight ratio of polymer-alumina within the hydrogel ranges from about 0.5:1 to about 4:1, and preferably from about 1:1 to about 2:1. Suitably, the exchange is accomplished by blending the components, stirring and filtering, with repetition of these steps until the hydrogel contains the desired amount of polymer, or by initial filtration of the gel with subsequent washing of the gel with polymer solution while the gel is contained on the filter.

If desired, the hydrogel can, at this time, be impregnated with a catalytically active amount of a metal hydrogenation component, or metal hydrogenation components, suitably a Group VIB or Group VIII metal (preferably a non-noble metal), or both (Periodic Table of the Elements, E. H. Sargent and Co., copyright 1962 Dyna-Slide Co.). The metal hydrogenation component can be incorporated into the hydrogel during the pore volume extending step, if desired, by the addition of soluble compounds, or salts, of such metals. Molybdenum of Group VIB and cobalt or nickel of Group VIII are preferred metals, particularly an admixture of these metals. Preferably, however, the hydrogenation component, or components, is added subsequent to calcination of the material, as subsequently discussed.

4. The polymer containing hydrogel is dried, suitably at temperatures ranging from about 85° F. to about 350° F., and preferably from about 212° F. to about 250° F., to form a gel. In this step, the pore structure of the hydrogel is set and the hydrogel converted into boehmite. The boehmite, after drying, exists as a granular substance which can, by proper adjustment of its solids (or liquid) content, be formed into various shapes, e.g., extrudates or spheres.

5. The polymer is then removed from the boehmite shapes, i.e., extrudates or spheres, preferably by contact and extraction with a suitable solvent. The $C_4+$ alcohols, notably the $C_6$ and $C_6+$ alcohols, are highly preferred for extraction and removal of the polymer.

6. The boehmite shapes, i.e., extrudates or spheres, after removal of the polymer are then dried, calcined and preferably at this time impregnated with a metal hydrogenation component, or components. Suitably a catalytically active amount of a metal hydrogenation component, or metal hydrogenation components, notably a Group VIB or Group VIII metal (preferably a non-noble metal), or both (Periodic Table of the Elements, E. H. Sargent and Co., copyright 1962 Dyna-Slide Co.), is incorporated into the alumina shapes by impregnation thereof with solutions of soluble compounds, or salts, of such metals. In the impregnation, the metal hydrogenation component, or components, is impregnated into the dried, calcined alumina from an aqueous or $C_1$-$C_3$ alcohol solutions, and preferably $C_4+$ alcohol solutions, and then dried at a very slow rate, prior to a final calcination, to enhance catalyst activity.

Catalysts of both extrudate and spherical shape have been found particularly useful in the hydroprocessing of unconventional whole heavy crudes and residua, particularly extrudate and spherical catalysts ranging from about 1/50 to about ⅛ inch, preferably from about 1/32 to about ⅛ inch, and more preferably from about 1/32 to about 1/16 inch particle size diameter. Pursuant to the practice of this invention, catalysts in the shape of very smooth hard extrudates and spheres can be formed. These catalysts are particularly useful as fixed beds in hydroprocessing processes, largely because of the uniformity of the particles and roundness of the spheres which considerably reduce pressure drop as contrasted with the use of catalysts of more irregular shape which tend to pack more closely together. The catalysts are also especially suitable for use in liquid fluidized or ebullating beds. The diffusion limitations concomitant to the hydroprocessing of the high metals content whole heavy crudes and residua are largely overcome, pore blockage is suppressed, and there is a significant beneficial effect in the ability of the smaller particle size catalyst to desulfurize, demetallize, and denitrogenate such feeds. High concentrations of the metals, notably nickel and vanadium, are removed from such feeds during the hydroconversion reaction, and yet good catalyst activity maintenance is achieved. A high rate of hydrodesulfurization is attained.

In the catalysts of this invention, there is a direct relation between particle size and pore size. The catalysts of this invention include a combination of properties:

a. when the catalyst is of size ranging from about 1/50 inch up to 1/25 inch average particle size diameter, as follows:

| | Typical | Preferred |
|---|---|---|
| Surface Area, [1] m²/g | 200–500 | 225–325 |
| Pore Volume, [2] cc/g | 0.5–1.5 | 0.7–1.1 |
| Pore Size Distributions, cc/g [3] | | |
| 100–200A | >0.3 | >0.4 |
| 200–400A | >0.05 | >0.1 |
| 400A+ | <0.2 | <0.1 |
| 1000A+ | <0.1 | <0.05 |

[1] Measured by single point adsorption using BET equation.
[2] Measured by filling of the pores with nitrogen in a single point measurement.
[3] Measured by combination of Digisorb Desorption and Mercury Intrusion.

b. when the catalyst is of size ranging from about 1/25 inch to about ⅛ inch average particle size diameter, as follows:

| | Typical | Preferred |
|---|---|---|
| Surface Area, [1] m²/g | 200–500 | 250–350 |
| Pore Volume, [2] cc/g | 0.7–1.7 | 0.8–1.3 |
| Pore Volume Distributions, cc/g [3] | | |
| 100–200A | >0.3 | >0.4 |
| 200–400A | >0.05 | >0.1 |
| 400A+ | <0.2 | <0.1 |
| 1000A+ | <0.1 | <0.05 |

[1] Measured by single point adsorption using BET equation.
[2] Measured by filling of the pores with nitrogen in a single point measurement.
[3] Measured by combination of Digisorb Desorption and Mercury Intrusion.

In all forms of the catalysts, the pore volumes resultant from pores of 50A, and smaller, i.e., 50A−, and those resultant from pores of 400A, and larger, i.e., 400A+, are minimized. The small pores are ineffective in producing effective hydrodesulfurization, and the large pores permit all too rapid loss of catalyst activity. The surface areas and pore volume of the catalysts are interrelated with particle size and pore size distributions. Surface areas range generally at least about 200 m²/g to about 500 m²/g, and preferably at least about 225 m²/g to about 350 m²/g, with pore volumes ranging from about 0.5 to about 1.7 cc/g, and preferably from about 0.7 to about 1.3 cc/g (B.E.T.).

In their optimum forms, the absolute pore size diameter of the catalyst, dependent on particle size, is maximized within the 100–200A and 200–400A ranges, respectively. The 100–200A range is believed to provide a maximum of active sites for effecting hydrodesulfurization, and the 200–400A range is found to provide high demetallization. It is not practical, of course, to eliminate the presence of all pores of sizes which do not fall within these desired ranges, but in accordance with this invention, it is practical to produce catalyst particles, inclusive of those of extrudate and spherical shapes, having absolute pore size diameters highly concentrated within these desired ranges.

These and other features of the invention will be better understood by reference to the attached drawing, and to the following detailed description of a highly preferred process for the preparation of extrudates and spherical catalysts in accordance with this invention.

In the drawing:

The FIGURE schematically depicts a preferred flow plan, starting with the blending of the hydrogel and the polymer containing solvent and ending with the finished catalyst.

Referring generally to the FIGURE for an overview of the process, there is depicted a flow plan suitable for use in the formation of alumina extrudates or spheres comprising the combination of a blender 10 wherein a previously washed, moist alumina hydrogel, as formed in Steps 1 and 2, supra, is blended with makeup polymer and recycle polymer for displacement of water and incorporation of polymer within the hydrogel, as in Step 3, supra; a spray drier 20 wherein the hydrogel is reduced to microspherical form, the pore size set and the hydrogel converted to essentially boehmite; a muller 30 wherein water is added to the microspherical boehmite to physically convert the latter to a paste of extrudable consistency; and, an extruder 40 wherein the granulated boehmite is extruded through an aperture or die. If it is desired to form spheres (which are formed from extrudates), the extrudates are first dried in extrudate drier 50 and then passed through a series of marumerizers 60, 70 wherein the extrudates are broken, fragmented and formed into spheres. If extrudate forms are desired, the granulated material from the extruder 40 can be passed directly to the extractor 80, or dried in extrudate drier 50 and then passed to the extractor 80. Suitably, extrudates from drier 50, or spheres from the marumerizers 60, 70, are passed to extractor 80, wherein the polymer is separated from the extrudates or spheres, and the solvent and polymer are recovered. In the extraction of the solvent and polymer, the extrudates from drier 50, or spheres from the series of marumerizers 60, 70, are initially contacted with fresh or recycle solvent from the stripping column 90, and the used solvent and shaped boehmite then separated one from the other. The used solvent is then passed to distillation column 100 wherein polymer is recovered from the bottom of the column and recycled to the blender 10. Overhead from the distillation column 100, principally solvent and water are then passed to stripper 90 wherein solvent is removed from the stripper 90 and passed to the extractor 80, and water is also rejected from the stripper. (In some instances it may also be desirable to extract polymer from the dried solids prior to the formation of spheres or extrudates. In such case the product from blender 10 is dried in spray drier 20, or a low temperature drier. The dried product is then contacted in extractor 80, and the extracted product recycled to muller 30 for treatment in the sequence of steps described. Product from the marumerizer 70 would then be dried, and directed to calciner 110.) The recovered granulated boehmite solids from extractor 80 are passed to a first calciner 110 wherein the boehmite is converted to gamma alumina. Gamma alumina from calciner 110, in the more preferred embodiment, is then impregnated in impregnation stage 120, with the desired Group VIB or Group VIII metal, or preferably an admixture of Group VIB and Group VIII metals, dried in drier 130, and then again calcined in the second calciner 140, from where the finished catalyst is removed.

The polymer is added to the hydrogel in polymer solvent blender 10. Within blender 10, a solution of the desired water soluble polymer is blended with sufficient of a recycle stream from the distillation column 100 to displace water and add polymer to the alumina hydrogel in polymer:alumina ratios ranging from about 0.5:1 to about 4:1, preferably from about 1:1 to about 2:1, based on weight, at generally ambient temperature and pressure, suitably at temperatures ranging from about 70° F. to about 85° F. Makeup polymer can be added, if required. The hydrogel is removed from the blender 10 as a slurry, suitably a pumpable slurry and, if necessary, excess water-polymer solution or water is added for such purpose.

Spray drier 20 is employed to convert the hydrogel to boehmite, and form the pore structure required for good hydrodesulfurization and demetallization properties. Suitably, the hydrogel is spray dried, i.e., dried by countercurrent contact of an atomized hydrogel spray with air, at air temperatures ranging from about 250° F. to about 350° F., and preferably at temperatures ranging from about 275° F. to about 300° F. Relatively low temperatures are desirable to minimize oxidation, and to avoid decomposition and loss of polymer. The temperature of the hydrogel or boehmite per se is maintained below about 250° F., and preferably from about 225° F. to about 250° F. Pressures are not critical, and generally atmospheric or near atmospheric pressure is employed. The spray drier per se is conventional, nozzles of various commercial types being suitable for ejection of the hydrogel slurry as a spray. On egress of the granulated boehmite from the spray drier 20 the microspherical solids range in average particle size diameter from about 75 to about 125 microns. Generally, the spray drier material contains from about 30 to about 35 weight percent alumina, from about 30 to about 60 weight percent polymer, and from about 5 to about 40 weight percent water.

The muller 30 is used to adjust the solids content of the alumina to assure a paste of extrudable consistency. At this point, e.g., if too much water has been removed in the drying step, a liquid, suitably water, can be added to form an extrudable homogeneous paste. The solids content of the paste leaving the muller 30 is critical, and hence the amount of water added, if any, is somewhat critical. If, on the one hand, too much water is added, it is impractical to extrude the material because it becomes too sticky, and beyond this point it becomes impossible to form an extrudable solids phase. On the other hand, if too little water is present, the material cannot be extruded without significant loss of pore volume, and degradation of the pore size distribution. To avoid excessive pore volume loss, it is desired to maintain >20 weight percent solids, preferably >22 weight percent solids, albeit added water facilitates the expression of the paste through the die apertures. Torque has been found to increase exponentially as the solids content of the paste is increased above about 25 weight percent, and this also tends to decrease pore volume. For this reason it has heretofore been considered undesirable to extrude aluminas of solids contents greater than 30 weight percent.

In application Ser. Nos. 646,490 - 646,492, supra, extrusion by the application of high torques was avoided, not merely because greater energy was required, but principally because some of the desired pore structure created at much effort was lost. The torques that were applied were below 25 inch-pounds, and the solids contents of the pastes were maintained below about 30 weight percent. It has now been discovered, however, that higher torques can be applied to great advantage albeit some of the desired pore structure is crushed and lost. By use of torques ranging from about 25 to about 55 inch pounds, preferably from about 40 to about 50 inch pounds it has been discovered that macropore volume, i.e., pores of sizes ranging 400A+, particularly 1000A+, can be drastically reduced. In accordance with this invention macropore volume in 400A+ pores has been further reduced by the application of such torques to 0.2 cc/g, and preferably below 0.1 cc/g, which has an enhanced effect in improving the activity maintenance of the catalyst. Further, even where some of the catalyst activity is lost as a result of loss of pore structure in the desired ranges, even this can be off set, or compensated for by improved impregnation techniques subsequently discussed in detail. For best results in the macropore volume reduction, the solids content of the paste is maintained between about 26 and 32 weight percent, preferably between about 29 and 32 weight percent solids.

The solids content of the paste is regulated within the muller 30 for reasons stated, but to some degree the solids content is regulated to produce the desired particle size of the spheres, where spheres are desired. In general, the relation between the solids content of the paste, the required extrudate diameter, and the average spherical particle size diameter within the range of torques expressed is as follows:

| Solids Content of the Paste, Wt. % | Required Extrudate, Diameter, Inches | Average Sphere Size Diameter, Inches |
|---|---|---|
| 30–32 | 1/55–1/28 | 1/50–1/25 |
| 28–30 | 1/32–1/21 | 1/25–1/16 |
| 26–28 | 1/24–1/12 | 1/16–1/8 |

The paste from the muller 30, containing the desired amount of solids, is conveyed as a substantially homogeneous mass to the extruder 40 for formation of the paste into extrudates. In forming extrudates, the boehmite paste is extruded through a die, suitably one having a plurality of apertures to form "spaghetti," or spaghetti-like shapes. The spaghetti-like shapes can be sized to the desired length by cutting the shapes as they are emitted from the mouth of the extruder, or broken and sized downstream of the extruder by conventional means; even by normal breakage as occurs, e.g., when such material is conveyed on belt driers. Excessive torque is to be avoided in the extrusion, consistent with the objectives stated, to avoid loss of pore volume and degradation of the pore size distribution by distortion or crushing of the pores in the desired ranges. The smaller the die apertures, of course, the greater the force required to effect the extrusion and, whereas the reduction of the solids content of the paste (by water addition at the muller 30) lessens the amount of force that must be applied, there is, as stated, a limit on the amount of water than can be added (or solids reduced) because excessive water also causes loss of pore volume and pore size distribution during extrusion as well as loss of crush strength. In general, with conventional extrusion equipment, e.g, a low torque extruder, Model 0.810 Research Extruder manufactured by Welding Engineers of King of Prussia, Pennsylvania, extrudates of outstanding quality of cross-sectional diameters ranging from about 1/40 to 1/16 inch have been produced.

The cross-sectional diameter of the extrudate is preselected to provide an extrudate of the desired diameter, or the desired sphere sizes, a sphere being of somewhat larger particle size diameter, generally from about 10 percent to about 50 percent larger than the diameter of the extrudate from which it is produced. The difference between sphere diameter and extrudate diameter is primarily dependent upon the weight percent solids of the paste from which the extrudate is formed, which relationship will be better understood by a consideration of the mechanism involved in the formation of spheres from extrudates discussed in Application Ser. Nos. 646,490 – 646,492, herewith referred to and incorporated by reference.

Extrudates are next dried in drier 50, suitably a circulating air oven, at temperature ranging from about 150° F. at residence time sufficient to form extrudates of critical solids content above about 20 weight percent, suitably within a range of from about 22 to about 32 weight percent, preferably within a range of from about 26 to about 32 weight percent, and more preferably from about 29 to about 32 weight percent.

In the formation of spheres, where spheres are the desired catalyst form, the extrudates, of critical solids content, are next fed batchwise or continuously, preferably the latter, to a series of two or more marumerizers 60, 70. The first marumerizer 60 of the series is provided with a rotatable roughened plate suitably of grid design for breaking up the extrudates which initially form into "dumbbell" shapes, which gradually and progressively separate into spheres, and the second marumerizer 70 is provided with a smooth rotatable plate for smoothing the surfaces of the preformed spheres. Suitable marumerizers for such purpose are available commercially, e.g., a Q-230 model made by Eli Lily. A suitable grid is one described as 1.5 mm. friction plate as described in the Marumerizer and Extruding Equipment Operating Manual published by Equipment Sales Dept., Elanco Products Co. of Indianpolis, Indiana, and a suitable smooth plate is one characterized as a polishing plate described in the same publication.

In the operation of marumerizers 60, 70, dry spaghetti-like extrudates are dropped onto the revolving grid plate of marumerizer 60, and after a suitable residence time the spheres are passed into marumerizer 70, to finish the formation of the spheres. The time required for marumerization is a direct function of the solids content of the extrudate, the speed of rotation of the plates of the marumerizers 60, 70 and type of plates used. Typically, the time required for marumerization ranges from about 10 minutes to about one-half hour. Initially, a single fragment of an extrudate is broken into a plurality of segments having length: diameter ratios ranging from about 8:1 to about 10:1. Within, e.g., about 15 seconds a first dumbbell shape is formed from a segment, and after about 30 seconds one or more of the ends of the dumbbell are broken off and formed into spheres. The process is continued until finally a short dumbbell segment or double sphere, is formed into a single sphere which generally occurs within from about 2 to about 5 minutes. Generally, from about 6 to about 8 spheres are formed from an original extrudate segment. The spheres are somewhat irregular in shape when contacted with the plate of marumerizer 60, but are rounded off to become smooth, uniform spheres in marumerizer 70 where they are buffed upon the smooth plate. The size of the spheres formed is a function of the extrudate diameter and the weight percent solids.

The spheres, or extrudates, e.g., from drier 50 (where the extrudate catalyst form is desired), are contacted in the extraction zone, or extractor 80, with fresh solvent to extract the polymer. The extraction can be done batchwise or continuously, preferably continuously. Extraction is suitably accomplished in a preferred embodiment by use of a moving bed extractor wherein the solids are introduced into the top of a column, and hot solvent is introduced into the bottom of the column. Suitably, the fresh solvent is introduced at temperature ranging from about 140° F. to about 285° F., or preferably from about 175° F. to about 230° F. Preferably, the solvent is introduced at a temperature just below, or at its boiling point. Hot solvent is removed from the top of the column, and the extracted boehmite solids are removed from the bottom of the column.

The polymer containing solvent, as schematically depicted in the figure, is passed into a distillation column 100, a polymer or polymer concentrate being separated and removed from the bottom of the column 100 and recycled to the blender 10. A solvent and water mixture, taken from the overhead of column 100, is passed to a stripper 90 for removal of water, and the dehydrated polymer-denuded solvent is recycled to extractor 80.

Various solvents are suitable for the extraction of the polymer and water from the boehmite spheres, or extrudates. The solvent employed is one which is soluble in water, and which is capable of dissolving the polymer from the spheres. It is also desirable that the solvent be one which can be desiccated, or one from which the water can be easily stripped. Suitably, also, it is one which boils within a range of from about 140° F to about 315° F, preferably from about 175° F to about 315° F. Low molecular weight alcohols are a particularly preferred class of solvents, preferably those which contain from 1 to about 6 carbon atoms, more preferably from about 4 to about 6 carbon atoms, in the total molecule. The monohydric alcohols are preferred. Other solvents which may be employed are ethers, aldehydes, ketones, halogenated hydrocarbons, e.g., chlorinated hydrocarbons, and the like, generally within about the same molecular weight range as the alcohols. In extraction with the low molecular weight alcohols, e.g., methanol, ethanol, isopropanol, n-propanol, 1-butanol, amyl alcohol, hexanol and the like, generally from about 70 to about 95 weight percent of the polymer is recovered.

The spheres, or extrudates, on egress from the extractor 80 are dried to remove the solvent, suitably at ambient temperatures or at temperatures ranging from about 100° F to about 600° F, preferably from about 300° F to about 500° F. Suitably, the spheres, or extrudates, are dried in circulating air, in vacuum, microwave oven, or the like, at least for a time sufficient to remove liquid from the pores.

The dried spheres, or extrudates, are then calcined as in a first calciner 110 to convert the boehmite to gamma alumina. In the calcination, it is required to raise the temperature of the dried spheres to at least about 1000° F in an atmosphere of nitrogen or other nonreactive medium, but preferably the calcination is conducted in an atmosphere of air. If air is not employed initially, then a terminal step must be employed wherein the catalyst is heated in air at a temperature of at least about 1000° F., preferably from about 1200° F. to about 1400° F. It is found that gamma alumina is readily formed by raising the temperature from ambient to about 1000° F., or higher, at a rate in excess of about 2° F./minute, preferably from about 3° F./minute to about 5° F./minute. After calcination temperature is reached, the temperature is maintained for periods ranging from about 10 minutes to about 6 hours, from about 2 to about 4 hours being typical, preferably the alumina being calcined in air for the entire period.

Preferably, in the practice of this invention, a metal hydrogenation component, or components, is added to the gamma alumina sphere, or extrudate, by impregnation rather than by hydrogel impregnation as previously discussed. In such impregnation, the calcined gamma alumina is thus next composited with a metal hydrogenation component, or components, e.g., as by impregnation within an impregnation stage 120, or series of such stages. The Group VIB and Group VIII metal components, admixed one component with the other or with a third or greater number of metal components, can be composited or intimately associated with the porous inorganic oxide support or carrier in impregnation zone 120 by impregnation of the support with the metals, e.g., with the alumina, by an "incipient wetness" technique, or technique wherein a metal, or metals, is contained in a solution, preferably alcohol, in measured amount and the entire solution absorbed into the support and subsequently dried and calcined to form the catalyst.

In forming a solution for impregnation of a support, the necessary amount of solution to be employed in such recipe (measured in cubic centimeters, cc) for impregnation of a support by an incipient wetness technique can be determined quite closely by multiplying the pore volume (PV) of the support to be impregnated by the weight of the support, which product is then multiplied by a factor of 1.6. A more preferred method of impregnation, however, requires about three times the volume of solution as required for impregnation by the incipient wetness technique. By a threefold increase in the volume of solution used for the impregnation, more time is allowed for the diffusion of the metals into the pores. In a particularly preferred embodiment, the metal, or metals, is added to the catalyst in small dosages by incremental additions of the solution. In this mode of catalyst preparation, the metal, or metals, is more uniformly deposited and deeper penetration of the pores by the metal, or metals, is effected. Better dispersion of the metals throughout the catalyst is obtained, and there is far less "capping off" or closure of the pores by metal deposits formed at pore entrances.

The method of drying the catalyst to remove the solution from the catalyst constitutes a key and novel feature of the present invention, and produces a considerable improvement in the activity of the catalyst for hydrodesulfurization. The drying step in all its aspects is carried out, as in drier 130, by a controlled slow rate of evaporation of the solvent from the catalyst, suitably at a rate less than about 2° F./minute, and preferably at a rate not exceeding about 1° F./minute. The metal, or metals, impregnated catalyst, while yet wet, but preferably surface dried, is heated at such slow rate up to a minimum temperature corresponding to the boiling point of the solvent contained within the catalyst, and preferably to a temperature ranging up to about 50° F., suitably from about 25° F. to about 50° F. above the boiling point of said solvent. Partial saturation of the vapor space above the catalyst with a solvent identical to that being evaporated constitutes a preferred technique for controlling the rate of evaporation of the solvent from the pores of the catalyst, this being particularly desirable for relatively low boiling point liquids, e.g., water and $C_1$ to $C_3$ solvents, e.g., alcohols.

In one of its aspects, e.g., a surface dry catalyst having been impregnated with an aqueous or $C_1$-$C_3$ metals-containing solution is placed in a circulating oven, rotary drum drier or the like, at ambient or room temperature, and a non-reactive or inert sweep gas is passed thereover while the temperature of the catalyst is increased at a rate less than about 2° F./minute, preferably less than about 1° F./minute. Suitably, to aid in controlling the rate of evaporation of moisture from the pores of the catalyst, the entering sweep gas is one saturated with at least about 5 percent, preferably at least about 15 percent, and more preferably at least about 25 percent, based on the total volume of the gas, of water or of the respective $C_1$–$C_3$ alcohol being evaporated from the catalyst. Whereas almost complete saturation of the sweep gas with the respective $C_1$–$C_3$ alcohol produces satisfactory results, and slows the rate of evaporation, this is not necessarily economical because recovery of the alcohol is generally desirable and hence oversaturation of the gas may unduly burden the process.

In another of its aspects, the rate of evaporation can be more readily controlled by use of a higher boiling solvent, e.g., a $C_4$–$C_6$ alcohol, (1) by the use of such solvent in the initial metal, or metals, impregnation or (2) by immersing the water of $C_1$–$C_3$ containing metal, or metals, impregnated into the higher molecular weight alcohol solution and permitting equilibration and displacement of the lower boiling solvent from the pores of the catalyst. Suitably, this can be accomplished by immersion of the surface dried catalyst containing the low molecular weight solvent into a bath of the higher molecular weight solvent, at room temperature or at elevated temperature and allowing sufficient time for equilibration. Preferably, the bath is heated to the boiling point of the high molecular weight solvent, and the boiling continued for a period ranging from about 2 to about 6 hours after which time the lower boiling solvent have been virtually completely displaced by the higher boiling solvent. Whereas the vapor space above the catalyst can be partially saturated to control the rate of evaporation of solvent from the pores, this is not generally necessary with the higher boiling solvents.

The reason for the increased hydroconversion activity of catalysts prepared by such slow drying technique vis-a-vis catalysts conventionally prepared without regard to drying rate is not understood, though Applicant believes that this phenomenon is subject to a reasonable explanation. Applicant believes that the slow drying technique produces a gradual and more controlled and gradual salting out of the metal, or metals, from solution as the meniscus of liquid recedes within the capillary pores and openings within the catalyst. On the one hand, a fast drying rate favors deposition of relatively large agglomerates of metal at or near the mouths of the pores. Not only are the pore mouths blocked by these deposits, but also only a relatively small amount of metal, if any, is deposited deep within the pores. The exits, or pore mouths, thus tend to be restricted by such unfavorable deposition of the metals and diffusion of reactants into the pores becomes more difficult. Also, there are fewer active sites because the metal is not adequately dispersed. On the other hand, slow drying rates favor a very gradual salting out or dispersal of the metals within the pores, with the consequence that the deposits are of much smaller size, more uniform and extend far deeper into the pores. The latter catalysts are thus considerably more active because the reactants and reaction products can better diffuse into and out of the pores of the individual catalyst particles, and there are far more active sites available to catalyze the reaction. Consequently, any of the catalysts heretofore described and others can be improved by this method of drying. Even off-specification catalysts can be improved by this method of impregnation and drying.

After the catalyst has been dried sufficient to complete the metals deposition, the temperature may then be elevated sufficiently to assume that all of the alcohol has been removed from the catalyst, e.g., by elevating the temperature to about 500° F. The catalyst is then again calcined as in Calciner 140. Suitably, the calcination is conducted at temperatures ranging above about 900° F., preferably from about 1000° F. to about 1100° F. in air. The catalysts thus formed are particularly suitable for use in hydroconversion processes as fixed beds and ebullating beds, but can be used in slurry form. When used in the form of fixed beds, the particle size diameter of the catalysts generally ranges from about 1/32 to about ⅛ inch, preferably about 1/16 inch. When used as ebullating beds, the catalyst generally range about 1/32 inch diameter and smaller.

The finished catalyst is comprised of a composite of a refractory inorganic support material, preferably a porous inorganic oxide support with a metal or compound of a metal, or metals, selected from Group VIB or Group VIII, or both, the metals generally existing as oxides, sulfides, reduced forms of the metal or as mixtures of these and other forms. Suitably, the composition of the catalysts comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB and one of said Group VIII metals, admixed one with the other and inclusive of third metal components of Groups VIB, VIII and other metals.

Preferred catalysts are constituted of an admixture of cobalt and molybdenum, but in some cases the preferred catalysts may be comprised of nickel and molybdenum. The nickel-molybdenum catalyst possesses very high hydrogenation activity and is particularly effective in reducing Con carbon. Other suitable Group VIB and VIII metals include, for example, chromium, platinum, palladium, iridium, osmium, ruthenium, rhodium, and the like. The inorganic oxide support is preferably stabilized with silica in concentration ranging from about 0.1 to about 20 percent, preferably from about 10 to about 20 percent, based on the total weight (dry basis) alumina-silica composition (inclusive of metal components).

Particularly preferred catalysts are composites of nickel or cobalt oxide with molybdenum, used in the following approximate proportions: from about 1 to about 12 weight percent, preferably from about 4 to about 8 weight percent of nickel or cobalt oxide; and from about 5 to about 50 weight percent, preferably from about 15 to about 25 weight percent of molybdenum oxide on a suitable alumina support. A particularly preferred support comprises alumina containing from about 10 to about 20 percent silica. The catalyst is sulfided to form the most active species. The bulk density of the catalyst generally ranges from about 0.2 to about 0.6 g/cc, preferably from about 0.2 to about 0.5 g/cc, depending on particle size.

The invention will be more fully understood by reference to the following selected nonlimiting examples and comparative data which illustrate its more salient features. All parts are given in terms of weight units except as otherwise specified.

In certain of the examples, and illustrations hereinafter described, the hydrodesulfurization and demetallization activity of the catalysts of this invention are compared with prior art catalysts, particularly catalysts made by the ethylene oxide process and by the earlier polymer extension method disclosed in the applications of Sawyer et al. and Robson, supra.

For purposes of comparison, Catalyst "EOC" has been taken as the standard ethylene oxide catalyst since its hydrodesulfurization and demetallization activities are unsurpassed among the catalysts which have been heretofore produced by the ethylene oxide method, and hence this catalyst has been assigned a hydrodesulfurization activity of 100, and a demetallization activity of 100. The properties of the Standard EOC Catalyst are given in Table I as follows:

TABLE I

| STANDARD ETHYLENE OXIDE CATALYST | |
|---|---|
| Surface Area [1] | 359 |
| Pore Volume [2], cc/gm | 1.38 |
| Pore Volume [3], cc/gm | 1.48 |
| PSD PV in [4] | |
| 0–50A | 0 |
| 150–250A | 32.4 |
| 350A+ | 11.0 |
| PSD, cc/gm PV in [5] | |
| 100–200A | 0.70 |
| 200–400A | 0.29 |
| 400A+ | 0.24 |
| 1000A+ | 0.05 |
| Metals Content, Wt. % | |
| CoO | 6.0 |
| MoO$_3$ | 20.0 |

[1] Single Pt. BET.
[2] Single Pt. N$_2$ adsorption filling pores.
[3] Digisorb desorption total PV.
[4] Adsorptomat.
[5] Combination Digisorb desorption and Hg intrusion.

Hydrodesulfurization and demetallization activities can best be compared in actual crude hydroconversion reactions and, for this purpose, a Cold Lake petroleum crude was employed as a standard feed in most of the examples and data hereinafter presented. The Cold Lake petroleum crude used for this purpose is identified as follows:

TABLE II

| STANDARD FEED FEEDSTOCK INSPECTIONS | |
|---|---|
| Inspections | |
| Gravity, ° API | 11.1 |
| Sulfur, Wt. % | 4.5 |
| Nitrogen, Wt. % | 0.459 |
| Oxygen, Wt. % | 0.2 |
| Con. Carbon, Wt. % | 12.0 |
| Asphaltenes (C$_5$), Wt. % | 17.9 |
| Carbon, Wt. % | 83.99 |
| Hydrogen, Wt. % | 10.51 |
| Metals ppm | |
| Ni | 74 |
| V | 180 |
| Na | 18 |
| Solids (3 Micron-filter) | 92 |
| VSU at 210° F. | |
| D-1160 | |
| IBO | 463 |
| 5 | 565 |
| 10 | 622 |
| 20 | 712 |
| 30 | 817 |
| 40 | 916 |
| 50 | 1019 |
| % Rec. | 56.4 |
| % Res. | 42.4 |
| Light Ends | 1.2 |

In Examples 1 and 2, immediately following, the preparation of a polyethylene glycol (PEG) alumina extrudate under generally optimum conditions is described, such extrudate being impregnated with a hydrogenation component to provide a catalyst having well balanced hydrodesulfurization and demetallization properties.

EXAMPLE 1

An alumina hydrogel was prepared by combining a first solution, i.e., a sodium aluminate solution, and a second solution, i.e., an aluminum sulfate solution, at 50° F. In the preparation of the first solution, a sodium aluminate slurry was prepared by mixing 25.7 kg of NaOH with 24.9 kg of aluminum trihydrate. The slurry was then cooled, diluted with 1260.1 kg of water, and 2.3 kg of tetraethylorthosilicate then added to the aluminum sulfate solution. In the preparation of the second solution, approximately 75.6 kg of aluminum sulfate was dissolved in 629.7 kg of deionized H$_2$O, and the solution filtered. The filtered aluminum sulfate solution was then added slowly to the sodium aluminate slurry at 50° F, and the addition continued to a pH of 10. The slurry was then heated to 120° F. and filtered to recover the gel. The gel was slurried with deionized water and washed until the Na$_2$O content of the gel was less than 0.1 Wt.%, and SO$_4$ less than 1.5 Wt.%.

The washed gel was then mixed with 48.4 kg of polyethylene glycol (ca. 2 weights of PEG/1 weight of Al$_2$O$_3$) and reslurried with water to provide a slurry containing 5–10 Wt.% solids in liquid. The slurry was then spray dried, the feed rate of the burner having been adjusted to maintain a spray drier bottom temperature of 300°–350° F. The product had a particle size range of approximately 50–150 microns (0.002–0.006 inch particle size diameter) and a solids (Al$_2$O$_3$) content of ca. 35 Wt.%.

A 6500 gm portion of the spray dried alumina was then divided and mulled in 500 gm batches using a Cincinnati muller, which is the equivalent to mulling with a commercial muller or extrusion through a die having 3/16-inch holes. To each 500 gm batch, 90 cc of water and 8 drops of acetic acid were added prior to mulling. The acid acts as an extrusion aid by peptizing the alumina. The mulled material was extruded through a 3-hole 1/16-inch drill, non-recessed die at 1000 RPM applying 45–50 in.-lbs. of torque. The extrudates were air dried for 15 minutes, extracted in isopropyl alcohol for 1 hour at 160° F, and then extracted in hexanol for 1 hour at 260° F to remove the polymer. The extrudates were then calcined 1 hour at 500° F in N$_2$, 2 hours at 1000° F in N$_2$, and 2 hours at 1000° F in air. The properties of these extrudates are given in Table III, at Column 2, below. By controlling the torque in the 30–55 in.-lbs. region, but particularly in the 45–50 in.-lbs. range, a blank extrudate having highly desirable porosity properties can thus be obtained. The extrudate, it will be noted, also had good crush strength, the 4.8 lbs. crush strength having been determined by using the standard ⅛-inch anvil test.

EXAMPLE 2 (Catalyst 1E-21031)

This examples shows that by properly impregnating and drying a material such as that described in the foregoing example, a highly desirable catalyst with balanced hydrodesulfurization and demetallization properties can be prepared, one that is fully equivalent to an ethylene oxide catalyst.

2285 grams of alumina, prepared as per Example 1, was thus impregnated by first air-exposing to equilibrate with the moisture of the air. The alumina was then placed in 9000 cc of methanol to which was added 158 grams of cobalt chloride. The alumina was maintained in this solution for 1 hour and allowed to equilibrate. Two additional similar increments of 158 gm of cobalt chloride portions were then added to the methanol, one hour being allowed between each incremental addition. Next, 179 grams of phosphomolybdic acid were added to the methanol and the alumina maintained in this solution for 1 hour. Thereafter, three additional similar increments of phosphomolybdic acid were added to the solution, and the catalyst allowed to equilibrate for one hour after each addition. The solution was then allowed to stand for 17 hours, after which time the methanol was evaporated at 120° F until no surface methanol remained. The catalyst, which contained 5% CoO and 18% $MoO_3$, was simmered in hexanol for 1 hour at 260° F to displace methanol from the pores. The catalyst was then calcined at 500° F for 1 hour in $N_2$, next at 1000° F for 2 hours in $N_2$, and then at 1000° F for 2 hours in air. The properties of the catalyst are given in Table III, at Column 3, which follows:

TABLE III

|  | Extrudate of Example 1 | Catalyst IE-21031 |
|---|---|---|
| Surface Area [1], $m^2/gm$ | 375 | 269 |
| Pore Volume [2], cc/gm | 1.13 | 0.80 |
| Pore Volume [3], cc/gm | 1.22 | 0.85 |
| PSD, cc/gm PV in [4] |  |  |
| 100–200A | 0.56 | 0.40 |
| 200–400A | 0.12 | 0.09 |
| 400A+ | 0.06 | 0.03 |
| 1000A+ | 0.03 | 0.03 |
| Strength, lbs. | 4.8 | — |

[1] Single Pt. BET.
[2] Single Pt. $N_2$ adsorption filling pores.
[3] Digisorb desorption total PV.
[4] Combination Digisorb desorption and Hg intrusion.

Side-by-side runs were made with Cold Lake petroleum crude, characterized in Table I, preheated to reaction temperature, and concurrently fed, with hydrogen, at the same temperature, downwardly through each of a pair of reactors, each containing a fixed bed of sulfided EOC Standard Catalyst (Table I) and Catalyst IE-21031, respectively. The process was run at a temperature of 750° F and under a pressure of 2250 psig. The feed rate was maintained at 1 V/V/Hr., hydrogen was fed at a rate of 6000 SCF/Bbl., and the runs were conducted over a period of 9 days. The results obtained are given as follows:

| Catalyst | Standard Ethylene Oxide Catalyst | Catalyst IF-21031 |
|---|---|---|
| Relative Activity after 9 Days |  |  |
| Hydrodesulfurization | 100 | 109 |
| Vanadium Removal | 100 | 100 |

The IE-21031 catalyst was thus equal or superior to the standard ethylene oxide catalyst for hydrodesulfurization and demetallization.

These data show that Catalyst IE-21031 has the desired low macroporosity in both the 400A+ and 1000A+ pores which provides good hydrodesulfurization activity maintenance; 100–200A pores which provides good hydrodesulfurization activity; and 200–400A pores which provides good demetallization. The low macroporosity excludes some of the very large metals-containing molecules from the pores of the catalyst, and hence excessive amounts of such metals are not deposited therein, this being necessary to insure good hydrodesulfurization activity maintenance.

In considering the properties of the Standard ethylene oxide, or EOC, Catalyst (Table I), one observes that the 1000A+ macroporosity is reasonably low; but the 400A+ macroporosity is excessive. Yet the ethylene oxide catalysts, in the light of the data which led to the present discovery, have relatively good activity maintenance; better than would be expected in the light of what is now known about the polymer-extended catalysts. The ethylene oxide catalysts, unlike the polymer-extended catalysts, tolerate excessive macroporosity in the 400A+ pores. Apparently, this is because the ethylene oxide catalysts have relatively greater surface areas, and consequently greater numbers of active sites. However, the polymer-extended catalysts, albeit they have relatively fewer active sites, do have sites which are more active, and thus such catalysts do possess higher extrinsic activity. Consequently because there are more active sites on the ethylene oxide catalysts, they can tolerate poisons more effectively than the polymer-extended catalysts. The sites of the polymer-extended catalysts being more active must be protected from the poisoning effect of the large molecules by minimizing the 400A+ macropores.

The superior intrinsic activity of the active sites of the polymer-extended catalysts of this invention for purposes of hydrodesulfurization is demonstrated by the following test data.

EXAMPLE 3

For comparative purposes, both the Standard EOC ethylene oxide catalyst and Catalyst IE-21031 of Example 2 were tested for hydrodesulfurization activity using a standard vacuum gas oil, the inspections on which are presented in Table IV as follows:

TABLE IV

| VACUUM GAS OIL FEEDSTOCK INSPECTIONS | |
|---|---|
| Inspections |  |
| Gravity, °API | 21.2 |
| Sulfur, Wt. % | 2.37 |
| Nitrogen, Wt. % | 0.090 |
| Metals, ppm |  |
| Ni | 0.11 |
| V | 0.68 |
| D-1160 |  |
| IBP | 603 |
| 5 | 786 |
| 10 | 822 |
| 50 | 909 |
| 95 | 991 |
| Dry | 1050 |

Runs were made with the feed, characterized in Table IV, preheated to reaction temperature and concurrently fed, with hydrogen, at the same temperature, upwardly through a reactor. In each run, the reactor contained a fixed bed of sulfided EOC Standard Catalyst (Table I) and Catalyst IE-21031 (Table III), respectively. The run in each instance was conducted at a temperature of 670° F and under a pressure of 1500 psig, while the feed rate was maintained at 0.5 V/V/Hr., and hydrogen was fed at a rate of 1500 SCF/Bbl. The runs were conducted over a period of 4–6 days, the results obtained being given as follows:

| Catalyst | Standard Ethylene Oxide Catalyst | Catalyst IE-21031 |
|---|---|---|
| Relative Activity after 6 Days |  |  |
| Hydrodesulfurization | 100 | 140 |

The sulfur bearing molecules of the feed are sufficiently small that diffusion limitations are minimized. Thus, the hydrodesulfurization activity measured in this manner is a measure of the basic intrinsic activity of the hydrodesulfurization sites. These data show that the improved polymer extended catalyst was about 40% more active than the standard EOC ethylene oxide catalyst. It is believed that the improved polymer extended catalyst has fewer active sites because of the lower surface area of the catalyst, but the intrinsic activity of these sites is considerably higher than those of the standard EOC ethylene oxide catalysts. Thus, the sites have to be protected from the poisoning effect of the very large molecules by low 400A+ macroporosity, this preventing access and adsorption of the very large molecules within the pores of the catalyst. Albeit the standard EOC ethylene oxide catalyst probably has more sites by virtue of its higher surface area, the sites are probably less active than those of Catalyst IE-21031. Consequently, a higher level of macroporosity is tolerated in the standard EOC catalyst as contrasted with the polymer-extended catalyst.

The following example is exemplary of conditions employed in the extrusion of various extrudates to provide alumina shapes of desirable porosity, particularly as relates to the application of torque.

EXAMPLE 4 a. Sample EB-10353, characterized in Table V, Column 2, is constituted of spray-dried PEG alumina extrudates prepared pursuant to the method disclosed in the Sawyer et al and Robson applications. The preparation of this material is described as follows: 6220 grams of the spray dried alumina prepared in Example 1 was mixed with 2520 cc of water to provide a 25% solids content. After initial mulling with mortar and pestle, the material was extruded through a 3/16-inch drill die containing 3 holes and having a ⅜-inch land length at 200 RPM, using the Welding Engineer 0.810 extruder. A torque of 10 in.-lbs. was applied, this mulling the material in a manner comparable to a commercial muller. This material was then extruded through a recessed face die containing twenty-three #72 drill holes and a land length of ⅜-inch by application of 23 in.-lbs. of torque. The extrudates were dried from 25 to 27% solids, and the material then successively extracted in isopropanol for 1 hour at 180° F, and hexanol for 1 hour at 280° F. The extracted extrudates were then calcined at 1000° F for 2 hours in $N_2$, and then for 2 hours in air. The properties of the material are given in Table V, at Column 2.

b. Sample MB-10361, the properties of which are described in Table V, Column 3, is constituted of spray-dried PEG alumina spheres made from extrudates, both the spheres and extrudates also having been prepared pursuant to the method disclosed in the Sawyer et and Robson applications. The preparation of this material is described as follows: 6620 gms of the spray-dried PEG powder mentioned in Example 4 (a), supra, was mixed with 2520 cc of $H_2O$ to make a paste containing 25% solids, and this material was mulled in identical manner. Then, the mulled paste was extruded as in Example 4 (a), this time by application of a torque of 22 in.-lbs. The extrudates were then dried to 27% solids and marumerized at 970 RPM on the coarse plate for 22 minutes and on the smooth plate for 3 minutes. Following this, the spheres were extracted in isopropyl alcohol for 1 hour at 180° F and then in hexanol for 1 hour at 280° F. The spheres were than calcined at 1000° F for 2 hours in $N_2$, and then for 2 hours in air. The spheres were held at 500° F for 1 hour prior to heating further to 1000° F to insure complete removal of the alcohol before calcining in air at 1000° F, this avoiding possible burning of the alcohol.

c. Sample 9-A, the properties of which are described in Table V, Column 3, was constituted of a 500 gm sample of the spray-dried alumina of Example 1. To the sample was added sufficient water to make a paste containing 28.3% solids. The material was mulled for 45 minutes in a Cincinnati muller and then further mulled by extrusion through a 3-hole, 3/16-inch drill die. The mulled paste was then extruded through a 6-hole, 1/32-inch drill (No. 62 drill) die applying a torque of 30 in.-lbs.

d. Sample 9-B, described in Table V, Column 5, was constituted of a 500 gram sample of spray-dried alumina of Example 1, and it was also mulled for 45 minutes in a Cincinnati muller and finally by extrustion through a 3-hole, 3/16-inch drill die which was ⅜-inch in land length. Water was added to the spray-dried solids, originally 35.5% $Al_2O_3$, to make a paste containing 30.6% solids. The mulled paste was then extruded through a 1/32-inch die containing 6 holes, yielding a torque of 45–50 in.-lbs.

e. Sample 9-C, the properties of which are identified in Table V, Column 6, was prepared in a manner identical to that of Sample 9-B except that the solids content was 33% solids, and the applied torque was 50–60 in.-lbs.

All of these samples were successively extracted with isopropyl alcohol and hexanol, then calcined at 1000° F in $N_2$ for 2 hours, and then at 1000° F in air for 2 hours.

TABLE V

| Sample | EB-10353 | MB-10361 | 9-A | 9-B | 9-C |
|---|---|---|---|---|---|
| Extrusion | | | | | |
| % Solids | 25 | 25 | 28.3 | 30.6 | 33.0 |
| Torque, in.-lbs. | 23 | 22 | 30 | 45–50 | 50–60 |
| Properties | | | | | |
| Surface Area [1], $m^2/gm$ | 345 | 396 | 443 | 437 | 428 |
| Pore Volume [2], cc/gm | 1.18 | 1.09 | 1.13 | 1.16 | 0.97 |
| Pore Volume [3], cc/gm | 1.18 | 1.15 | 1.22 | 1.30 | 1.10 |
| PSD, cc/gm PV [4] in | | | | | |
| 100–200A | 0.49 | 0.31 | 0.31 | 0.52 | 0.32 |
| 200–400A | 0.6 | 0.11 | 0.08 | 0.11 | 0.02 |
| 400A+ | 0.20 | 0.20 | 0.15 | 0.08 | 0.02 |
| 1000A+ | 0.14 | 0.17 | 0.14 | 0.05 | 0.01 |

[1] As measured by single point adsorption using BET equation.
[2] Single point nitrogen adsorption obtained by filling of pores.
[3] Pore volume as measured by Digisorb Desorption test, described later.
[4] Measured by combination of Digisorb Desorption and Mercury Instrusion.

In considering these data, it is apparent that the amount of torque applied is a critical factor in the preparation of the catalysts of this invention. Only the 9-B extrudate, when impregnated and dried by techniques of this invention, will provide an outstanding catalyst. This catalyst alone has the low macroporosity for good hydrodesulfurization activity maintenance, good 100–200A pore volume for high hydrodesulfurization activity, and sufficient of the 200–400A pores for good demetallization. It is clear from these data that the application of too much torque, on the one hand, reduces macroporosity, and also the number of 200–400A pores below the level required for good demetallization. On the other hand, too little torque does not reduce macroporosity sufficiently for good hydrodesulfurization activity maintenance. The following example shows the improvement in demetallization and hydrodesulfurization activity which can be obtained by utilizing the improved impregnation and slow drying techniques. The performance of this catalyst is compared to the performance of a catalyst prepared according to the methods disclosed in the application of Sawyer et al and Robson, supra.

EXAMPLE 5

A small sample of alumina spheres was prepared in a manner similar to that described in Example 4(a) (MB-10361). The 1/32-inch alumina spheres had a surface area of 403 m$^2$/g and a pore volume of 1.19 cc/g. A solution of 2.5 g of cobalt chloride and 33 g of phosphomolybdic acid in 58 cc of methanol was prepared and this solution was poured over 10 g of the alumina spheres. The system was allowed to equilibrate for 48 hours. The methanol was evaporated until the surface was essentially free of liquid methanol. At this time the catalyst was heated to 1000° F in air and held for 2 hours. The catalyst, which was designated IM-20081, represents the application of technology disclosed in Sawyer et al and Robson, supra. This catalyst had a surface area of 289 m$^2$/g and a pore volume of 1.03 cc/g and contained excessive macroporosity similar to that shown for ample MB-10361 of Example 4.

A second sample of alumina was utilized to make a catalyst. 21 g of Sample EB-10353 was air-exposed overnight to equilibrate with the moisture in the air. The sample was placed in 80 cc of methanol. As in Example 2, the cobalt and molybdenum salts were added incrementally to the methanol to minimize the formation of large crystallites at the pore mouth, and to obtain deeper penetration of the salts into the pores of the catalyst. Cobalt nitrate was added in 1.69 g increments over a three-hour period, and phosphomolybdic acid was then added in 1.56 g increments over a four-hour period. Thus, 5.07 g of cobalt nitrate and 6.24 g of phosphomolybdic acid were added to the methanol during this period. The sample was allowed to stand for 17 hours and the sample dried at room temperature until only a small amount of surface methanol remained. Next, the catalyst was heated from room temperature (72° F) to 150° F at a rate of 1° F/min. The heatup occurred under a flowing stream of N$_2$ saturated with methanol at 72° F, or N$_2$ containing ca. 17% methanol by volume. Once the catalyst bed reached 150° F, it was held for 1 hour under the flowing stream of N$_2$ containing methanol and finally it was held for 1 hour in a stream of pure N$_2$ at 150° F. The catalyst was subsequently heated to 1000° F in N$_2$ and held for 2 hours at 1000° F in air. The calcined catalyst in one containing 5% CoO, 18% MoO$_3$, 1% P$_2$O$_5$ and 76% Al$_2$O$_3$. The catalyst had a surface area of 282 m$^2$/g and a pore volume of 0.93 cc/g and contained excessive macroporosity similar to the first catalyst. This catalyst was designated IE-20721.

A third catalyst was prepared idential to IE-20721 except for the drying step. When the surface had become essentially free of surface methanol, the impregnated catalyst containing methanol in the pores was immersed in hexanol at room temperature. It was allowed to equilibrate for 1 hour to partially displace the methanol from the pores. The catalyst was then placed in a tube and heated from 72° F to 150° F at 1° F/min. under a flowing stream of N$_2$ containing 17 vol.% methanol. Next, it was heated at 1° F/min. from 150° F to 250° F in N$_2$ containing ca. 3% water vapor. The water was added because it was noted that water was evolving at this point, the water obviously having been produced from water hydrated with the Al$_2$O$_3$ and the water of crystallization of the cobalt and molybdenum salts. Finally, the catalyst was heated from 250° F to 300° F at 1° F/min. in a flowing stream of N$_2$ containing ca. 1% C$_6$OH. The catalyst was held at 150°, 250° and 300° F for 1 hour between each of these steps. Finally, at 300° F it was held for 1 hour in a flowing stream of pure N$_2$. The catalyst was subsequently heated to 1000° F in N$_2$ and held for 2 hours followed by calcining in air for 2 hours at 1000° F. The catalyst had a surface area of 299 m$^2$/g and a pore volume of 0.94 cc/g and contained excessive macroporosity. This catalyst was designated IE-20781.

These catalysts were then tested to determine their hydrodesulfurization and demetallization activities as described by reference to Example 2. The results are as tabulated below:

| Catalyst | IM-20081 | IE-20721 | IE-20781 |
|---|---|---|---|
| Relative Activity after ca. 10 Days | | | |
| Hydrodesulfurization | 66 | 70 | 78 |
| Vanadium Removal | 70 | 85 | 119 |

Note the prior art catalyst IM-20081 gave the poorest results. IE-20721 which represents a catalyst prepared by improved impregnation (incremental Co/Mo addition) and slow drying resulted in improved performance. Lastly, IE-20781 which is a further improvement on the slow drying stage (replacement of methanol with hexanol) shows further improvement.

The following example shows that the regimen of restrictive drying conditions required in Example 4 can be relaxed if essentially all of the low molecular weight solvent is replaced by a higher molecular weight, low vapor pressure solvent. In addition, the example further demontrates that even with optimum impregnation and drying conditions and low macroporosity giving good hydrodesulfurization activity maintenance, the overcompression of the extrudate such as to reduce the number of 200–400A pores will result in poor demetallization performance. Only the catalyst of Example 2, having all of the required porosity properties in addition to good impregnation and drying conditions, will result in a catalyst with an optimum balanced hydrodesulfurization and demetallization performance.

EXAMPLE 6

An extrusion paste was prepared by taking 100 gm of the spray-dried alumina of Example 1, and blending this material with 15 cc of water and 5 drops of acetic acid, the acid being added as an extrusion aid. The paste was mulled by mortar and pestle and then remulled by extrusion, i.e., passage through a 3/16-inch drill die at 100 RPM. The remulled material was then extruded through a 1/16-inch drill die having one hole and a land length ⅜-inch, at an RPM maintained at 100. The extrudates were air-dried for 15 minutes, extracted in isopropyl alcohol at 180° F for one hour, and then extracted in hexanol at 280° F for one hour. The extracted extrudates were calcined for 2 hours in N$_2$ at 1000° F and for 2 hours at 1000° F in air. The properties of these calcined extrudates, referred to as Sample EB-10403, are given in Table VI, Column 2, below.

Referring to Table VI, Column 2, as is evident from the data, excessive compaction of the extrudates resulted. Although low 400A+ and 1000A+ macroporosity resulted, the Sample EB-10403 alumina extrudates possess too low 200–400A pore volume which is needed for good demetallization. Two catalysts were made from the Sample EB-10403 material: Catalyst 6A and Catalyst 6B. The other two catalysts 6C and 6D were prepared by impregnating the extrudates described in Example 4(a) (EB-10353).

a. Catalysts 6A and 6C were each prepared in identical manner, as follows: 21 gm of the alumina base (EB-10403) was air-exposed overnight to equilibrate with the moisture in the air. Each sample was then placed in 80 cc of methanol. Instead of adding the cobalt and molybdenum salts all at once to the excess solvent, the salts were added incrementally to minimize formation of large crystallites at the pore mouths of the catalyst particles. Cobalt nitrate was added in three successive 1.69 gm increments, one increment each over a three-hour period, and then phosphomolybdic acid was added in four successive 1.56 gm increments, one increment each over a four-hour period. Each of the catalysts was then simmered in hexanol at 280° F for 1 hour to completely displace the methanol of the catalysts with hexanol, providing final catalysts containing 5% CoO, 18% $MoO_3$, 1% $P_2O_5$ and 76% $Al_2O_3$. The catalysts were allowed to stand for 17 hours and then dried at room temperature until only a small amount of surface hexanol remained. The catalysts were then simmered in hexanol at 280° F for 1 hour to completely displace the methanol with hexanol. Each catalyst was then calcined in $N_2$ for 2 hours at 1000° F, then in air for 2 hours at 1000° F.

In the foregoing, no special precautions such as slow heatup (1° F/min) or solvent in the sweep $N_2$ were utilized to assure slow evaporation of the hexanol from the pores. The presence of the low vapor pressure hexanol in the pores was considered sufficient to assure slow evaporation.

b. Catalysts 6B and 6D were prepared in a manner identical to Catalysts 6A and 6C except that the methanol containing alumina base, which had been surface-dried overnight, was immersed in hexanol at room temperature. The catalysts were then allowed to equilibrate for 1 hour to partially displace the methanol from the pores. The catalysts were each then placed in a tube and heated from 72° F to 150° F at 1° F/min. under a flowing stream of $N_2$ containing 17 vol. % methanol. The catalysts were then held at this temperature for 1 hour. Next, the catalysts were heated at 1° F/min. from 150° F to 250° F in $N_2$ containing ca. 3% water vapor. Water was added to the nitrogen because it was noted that some water was being evolved at this point, the source obviously having been the water hydrated with $Al_2O_3$ and the water of crystallization of the Co/Mo salts. The temperature, at the end of the period, was maintained at 250° F in the flowing stream for 1 additional hour. The catalyst was then heated from 250° to 300° F at 1° F/min. in a flowing stream of $N_2$ containing ca. 1% hexanol. The temperature was then held at 300° F for 1 hour in a flowing stream of pure $N_2$. The catalyst was subsequently heated to 1000° F in $N_2$ and held for 2 hours, this step having been followed by calcining in air for 2 hours at 1000° F. These steps were taken to assure slow evaporation of the solvent(s) from the pores since complete replacement of methanol with hexanol had not been effected.

The properties of Catalysts 6A, 6B, 6C and 6D are given in Table VI.

TABLE VI

| Catalyst | EB-10403 | 6A | 6B | EB-10353 | 6C | 6D |
|---|---|---|---|---|---|---|
| Surface Area [1], $m^2/g$ | 427 | 318 | 305 | 345 | 288 | 294 |
| Pore Volume [2], cc/g | 1.19 | 0.82 | 0.85 | 1.18 | 0.99 | 0.96 |
| Pore Volume [3], cc/g | 1.21 | 1.07 | 0.85 | 1.18 | 0.99 | 0.97 |
| PSD, cc/g PV [4] in | | | | | | |
| 100–200A | 0.53 | 0.56 | 0.47 | 0.49 | 0.46 | 0.48 |
| 200–400A | 0.09 | 0.01 | 0.01 | 0.16 | 0.10 | 0.10 |
| 400A+ | 0.03 | 0.03 | 0.03 | 0120 | 0.13 | 0.13 |
| 1000A+ | 0.02 | 0.02 | 0.02 | 0.17 | 0.11 | 0.11 |

[1] As measured by single point adsorption using BET equation.
[2] Single point nitrogen adsorption obtained by filling of pores.
[3] Pore volume as measured by Digisorb Desorption test, described later.
[4] Measured by combination of Digisorb Desorption and Mercury Intrusion.

These catalysts were tested as 14–35 mesh materials, and contrasted with the Standard ethylene oxide catalyst at similar conditions, in processing a Cold Lake petroleum crude fed as previously described in Example 2, with the following results:

| Catalyst | 6A | 6B | 6C | 6D |
|---|---|---|---|---|
| Relative Activity after 9 Days Hydrodesulfurization Activity | 117 | 117 | 72 | 72 |

These data show that the low macroporosity of Catalysts 6A and 6B produced good hydrodesulfurization activity maintenance, this being sharply contrasted with the poor hydrodesulfurization performance of Catalysts 6C and 6D which have high macroporosity. Catalysts 6A and 6B, however, were found to possess inferior demetallization performance due to the low pore volume in 200–400A pores. This example further shows that by replacing all of the methanol in the pores of a catalyst with hexanol prior to drying simplifies the procedure in that no special precautions are required to insure slow vaporization from the pores of the catalyst. This is because this solvent has low volatility.

The following example shows that a catalyst essentially equivalent to the standard ethylene oxide catalyst can be made by hydrogel impregnation. Hydrogel impregnation assures and good dispersion of the metals due to the interaction of the metals with the alumina at an atomic level, rather than depending entirely upon slow drying in the terminal impregnation step to form small crystallites on the surface of the calcined alumina. Although it is believed that the crystallite size is set at the impregnation step, slow drying is nonetheless necessary in the final calcination step to avoid reagglomeration of the metals on the surface.

EXAMPLE 7

An alumina hydrogel was prepared as in Example 1 except no polymer was added and the material was not spray-dried. A 64,900 gram portion of the hydrogel, which contained 3.8% alumina solids, was blended with 509 gms of cobalt chloride and 770 gm of phosphomolybdic acid. The blended material was then held for 4 hours and then blended with 3700 gm of polyethylene glycol having an average molecular weight of 300. The material was held overnight at a temperature of 190° F. After overnight drying (ca. 16 hours), the sample was extracted with isopropyl alcohol at 160°–170° F for 1 hour. The material was then air-dried for 30 minutes, and thereafter for 2 hours at 190° F. At the end of this period the solids content was 54.5%. Sufficient water was then added to make a paste containing 36% solids, and a minimum quantity of acetic acid was added as an extrusion aid. The material was first mulled with a mortar and pestle, then extruded using the 3-hole, 1/16-inch drill die at 100 RPM. The extrudates, after air-drying for 15 minutes, were treated with hexanol at 260° F for 1 hour to further extract the polymer and to displace the water from the pores. This was done to assure slow drying in the final calcination. The catalyst was calcined at 600° F for 1 hour in $N_2$, then at 1000° F for 2 hours in $N_2$, and finally at 1000° F for 2 hours in air. The properties of this catalyst, referred to below as Catalyst 7A, are given in Table VII below:

TABLE VII

| | |
|---|---|
| Surface Area [1], $m^2/g$ | 343 |
| Pore Volume [2], cc/g | 0.81 |
| Pore Volume [3], cc/g | 0.83 |
| PSD, cc/g PV in [4] | |
| 100–200A | 0.38 |
| 200–400A | 0.06 |
| 400A+ | 0.04 |
| 1000A+ | 0.02 |

[1] As measured by single point adsorption using BET equation.
[2] Single point nitrogen obtained by filling of pores.
[3] Pore volume as measured by Digisorb Desorption test, described later.
[4] Measured by combination of Digsorb Desorption and Mercury Intrusion.

It will be observed, on the one hand, that the 200–400A pore volume is low. On the other hand, the 100–200A pores are at an acceptable level. The macroporosity pore volumes are also acceptable for a good heavy feed conversion catalyst with balanced hydrodesulfurization and demetallization activities. Catalyst 7A, though somewhat off-specification, was tested in Cold Lake crude at conditions previously described in Example 2, and the results are shown below:

| Catalyst | Standard Ethylene Oxide Catalyst | Catalyst 7A |
|---|---|---|
| Relative Activity after 9 Days | | |
| Hydrodesulfurization | 100 | 95 |
| Vanadium Removal | 100 | 93 |

Results of this test show, within the precision of the test, that Catalyst 7A is almost the equivalent of the standard ethylene oxide catalyst, and also a terminally impregnated PEG catalyst. This boost in activity is sharply contrasted with that which would be expected of a catalyst with similar characteristics prepared by the conventional impregnation of a polymer-extended catalyst.

It is apparent that various modifications can be made in the conditions of operation, the precise nature of the feed and catalyst compositions, and the like, without departing the spirit and scope of the invention.

Pore size distributions, as percent of total pore volume for purposes of the Sawyer et al and Robson applications, supra, are measured at various pressures using the Aminco Adsorptomat Cat. No. 4-4680, and multiple sample accessory Cat. No 4-4685. The detailed procedure is described in the Aminco Instruction Manual No. 861-A furnished with the instrument. A description of the Adsorptomat prototype instrument and procedure is given in Analytical Chemistry, Volume 32, Page 532, April, 1960.

An outline of the procedure is given here, including sample preparation.

From 0.2 to 1.0 g. of sample is used and the isotherm is run in the adsorption mode only. All samples are placed on the preconditioner before analysis where they are out-gassed and dried at 190° C under vacuum ($10^{-5}$ Torr) for 5 hours. After pretreatment, the weighed sample is charged to the Adsorptomat and pumped down to $10^{-5}$ Torr. At this point, the instrument is set in the automatic adsorption mode to charge a standard volume of gas to the catalyst. This is done by charging a predetermined number of volumes as doses and then allowing time for adsorption of the nitrogen to reach equilibrium pressure. The pressure is measured in termns of its ratio to the saturation pressure of boiling liquid nitrogen. Three doses are injected and 8 minutes allowed for equilibration of each measured relative pressure. The dosing and equilibration are continued until a pressure ratio of 0.97 is exceeded and maintained for 15 minutes. The run is then automatically terminated.

The data obtained with the dead space factor for the sample, the vapor pressure of the liquid nitrogen bath, and the sample weight are sent to a digital computer which calculates the volume points of the isotherm, the BET area, and the pore size distribution of the Barret, Joyner, and Halenda method. [Barrett, Joyner, and Helenda, J. Am. Chem. Soc. 73, p. 373.] It is believed that the Barrett, Joyner, and Halenda method is as complete a treatment as can be obtained, based on the assumptions of cylindrical pores and the validity of the Kelvin equation.

Pore size distributions, as cc/gm of pore volume, for purposes of the present invention are measured by a combination of nitrogen desorption using the Digisorb 2500 and mercury injection using a Macromeritics Instrument Co. 50,000 lb. Model Porosimeter. Studies on the Adsorptomat and Digisorb 2500 in the adsorption mode have shown both instruments to be reproducible and reliable as "fingerprints" of the catalyst, but the pore size distributions obtained were somewhat larger in size using the Adsorptomat. This is though to result because the Adsorptomat does not always reach "equilibrium" pressure during the nitrogen dosing procedure. In addition to this factor, it is felt that the controlling pore size for diffusion is the pore mouth, thus nitrogen desorption and mercury intrusion should be more representative of this pore size. With some catalysts, mercury intrusion can be used to characterize the pore size distribution from 42A to ca. 200,000A in pore diameter. For higher pore volume catalysts ($>$ ca 0.7 cc/gm) the high pressure exerted on the mercury tube crushed the catalyst giving spurious results. To avoid the problem, a combination of nitrogen desorption and mercury intrusion is used. In the region of 100 to 200A pore diameter, the pore volume curves (cc/gm pore volume vs. pore diameter A) either cross or parallel one another. At this junction, the two curves are joined. In so doing, the nitrogen desorption curve is considered reliable over the region of 20A to ca. 150A pore diameter and the mercury injection over the range ca. 150A to ca. 200,000A pore diameter. For purposes of this invention, the combination method is utilized. Data from the Adsorptomat are included for comparison purposes to show that the catalysts of the present invention differ from prior art catalysts.

To obtain the pore volume distribution in the $>$ ca. 150A region, measurements were made by mercury injection using a Micromeritics Instrument Co. 50,000 lb. Model Porosimeter. Increments of pore volume were observed at increasing pressure and related to pores being intruded by the equation:

$$PD = 3\sigma \cos \theta$$

where P is the applied pressure, D the diameter of the pore, $\sigma$ the surface tension of mercury, and $\theta$ the contact angle between mercury and the material forming the pore opening. The surface tension of mercury ($\sigma$) was taken to be 474 dynes/cm and the contact angle ($\theta$) as 140°.

The measurement of the pore volume distribution in the region < ca. 150A was made by the Micromeritics Digisorb 2500 automatic surface area and pore volume analyzer. The detailed procedure is described in the Digisorb Instruction Manual of June 3, 1974. An outline of the procedure is given here, including sample preparation. From 0.1 to 0.2 gm sample is used and is outgassed at 150° C for 6 hours at about $10^{-5}$ Torr. After degassing, the weighed sample is repressured to atmospheric pressure with helium, transferred to the analysis ports of the instrument and pumped down to $10^{-5}$ Torr. The unit is then placed in the automatic mode for measurement of the desorption isotherm. This is done by the gradual addition of nitrogen to the catalyst until near to saturation pressure (P/Po = ca. 0.99). "Equilibrium" saturation pressure is attained by repeated addition of nitrogen at decreasing rates until "equilibrium" is established. Since complete theoretical equilibrim will require an infinite time to establish, a practical "equilibrium" is established when 7 consecutive pressure measurements, each taken at 6-second intervals, differ from the average pressure by 0.1% or less.

After establishing "equilibrium" saturation pressure, desorption is started and measurements obtained at preselected P/Po points. The desorption is carried out at 21 points, ending at a relative pressure of 0.2 (P/Po = 0.2). At each point, "equilibrium" is checked by the procedure noted above. Seven consecutive pressure measurements taken over 6-second intervals must not differ from the average pressure by more than 0.1%. At the completion of the desorption process, the test is automatically terminated and the samples are backfilled with helium to atmospheric pressure. A digital computer calculates the pore size distribution by the method of Barrett, Joyner and Halenda.

Data reported in the invention include (1) the surface area as measured by the familiar single point $N_2$ adsorption method using the BET equation, (2) pore volume as measured by the familiar technique of a single point measurement where all of the pores are filled with $N_2$, and (3) the pore volume distribution obtained by combination of $N_2$ desorption and mercury intrusion as reported above. Additionally, a total pore volume is reported which is obtained from the $N_2$ desorption pore volume distribution curve.

Having described the invention, what is claimed is:

1. In a process for the formation of a catalyst comprised of a Group VI-B or Group VIII metal, or both, composited with alumina in a series of steps which include precipitating alumina hydrogel from a solution which contains a hydrous form of alumina in concentration ranging from about 1 to about 5 percent, based on the weight of the solution, and a compound having an anion which forms an alkaline soluble aluminum salt in an alkaline medium, at temperatures ranging from about 15° F. to about 120° F. and pH ranging from about 8 to about 12, separating said alumina hydrogel from said alkaline solution, contacting said alumina hydrogel with a solution of a water soluble polymer containing from about 2 to about 24 monomer units from the group consisting of (a) polyethylene glycols, (b) polypropylene glycols, and (c) polyethylene amines sufficient to absorb the polymer into the pores of the alumina hydrogel and displace water from the pores until the weight ratio of polymer: alumina within the hydrogel ranges from about 0.5:1 to about 4:1, forming a slurry of the polymer containing alumina hydrogel, spray drying said slurry of polymer containing alumina hydrogel by countercurrent contact of an atomized spray of the alumina hydrogel with air at temperature sufficient to form granules of boehmite, forming a paste from the granules of polymer containing boehmite and water, the paste containing at least about 20 percent by weight of solids, and mulling said water soluble polymer containing boehmite paste to provide a substantially homogeneous mass, the improvement comprising:

extruding said polymer containing boehmite paste through a die to form spaghetti-like extrudate shapes by applying a torque ranging from about 25 to about 55 inch pounds, sizing and shaping the boehmite, contacting and extracting said boehmite shapes with a solvent to separate and remove the water soluble polymer therefrom, and then drying and calcining the shapes, and converting the boehmite shapes from which the polymer has been extracted to gamma alumina.

2. The process of claim 1 wherein the Group VIB or Group VIII metal, or both, is composited with the alumina by impregnation of the alumina hydrogel with a solvent containing a compound, or compounds, of the Group VIB or Group VIII metal, or both.

3. The process of claim 1 wherein the Group VIB or Group VIII metal, or both, is composited with the dried, calcined gamma alumina shapes.

4. The process of claim 1 wherein, (a) when the catalyst ranges from about 1/50 inch up to about 1/25 inch particle size diameter, it is characterized as follows:

| Surface Area, m²/g | 200–500 |
|---|---|
| Pore Volume, cc/g | 0.5–1.5 |
| Pore Size Distributions, cc/g | |
| 100–200A | >0.3 |
| 200–400A | >0.05 |
| 400A+ | <0.2 |
| 1000A+ | <0.1 | and (b) when the catalyst ranges from about 1/25 inch up to about ⅛ inch particle size diameter, it is characterized as follows:

| Surface Area, m²/g | 200–500 |
|---|---|
| Pore Volume, cc/g | 0.7–1.7 |
| Pore Size Distributions, cc/g | |
| 100–200A | >0.3 |
| 200–400A | >0.05 |

-continued

| | |
|---|---|
| 400A+ | <0.2 |
| 100A+ | <0.1 |

5. The process of claim 1 wherein, (a) when the catalyst ranges from about 1/50 inch up to about 1/25 inch particle size diameter, it is characterized as follows:

| | |
|---|---|
| Surface Area, m²/g | 225–325 |
| Pore Volume, cc/g | 0.7–1.1 |
| Pore Size Distributions, cc/g | |
| 100–200A | >0.4 |
| 200–400A | >0.1 |
| 400A+ | <0.1 |
| 100A+ | <0.05 | and (b) when the catalyst ranges from about 1/25 inch up to about ⅛ inch particle size diameter, it is characterized as follows:

| | |
|---|---|
| Surface Area, m²/g | 250–350 |
| Pore Volume, cc/g | 0.8–1.3 |
| Pore Size Distributions, cc/g | |
| 100–200A | >0.4 |
| 200–400A | >0.01 |
| 400A+ | <0.1 |
| 1000A+ | <0.05 |

6. The process of claim 1 wherein the extrudate shapes are contacted with solvent to extract the polymer, then dried and calcined to form gamma alumina.

7. The process of claim 6 wherein the Group VIB or VIII metal, or both, is composited with the dried, calcined, gamma alumina extrudate shape.

8. The process of claim 7 wherein (a) when the catalyst ranges from about 1/50 inch up to about 1/25 inch particle size diameter, it is characterized as follows:

| | |
|---|---|
| Surface Area, m²/g | 200–500 |
| Pore Volume, cc/g | 0.5–1.5 |
| Pore Size Distributions, cc/g | |
| 100–200A | >0.3 |
| 200–400A | >0.05 |
| 400A+ | <0.2 |
| 1000A+ | <0.1 | and (b) when the catalyst ranges from about 1/25 inch up to about ⅛ inch particle size diameter, it is characterized as follows:

| | |
|---|---|
| Surface Area, m²/g | 200–500 |
| Pore Volume, cc/g | 0.7–1.7 |
| Pore Size Distributions, cc/g | |
| 100–200A | >0.3 |
| 200–400A | >0.05 |
| 400A+ | <0.2 |
| 1000A+ | <0.1 |

9. The process of claim 7 wherein (a) when the catalyst ranges from about 1/50 inch up to about 1/25 inch particle size diameter, it is characterized as follows:

| | |
|---|---|
| Surface Area, m²/g | 225–325 |
| Pore Volume, cc/g | 0.7–1.1 |
| Pore Size Distributions, cc/g | |
| 100–200A | >0.4 |
| 200–400A | >0.1 |
| 400A+ | <0.1 |
| 1000A+ | <0.05 | and (b) when the catalyst ranges from about 1/25 inch up to about ⅛ inch particle size diameter, it is characterized as follows:

| | |
|---|---|
| Surface Area, m²/g | 250–350 |
| Pore Volume, cc/g | 0.8–1.3 |
| Pore Size Distributions, cc/g | |
| 100–200A | >0.4 |
| 200–400A | >0.1 |
| 400A+ | <0.1 |
| 1000A+ | <0.05 |

10. The process of claim 1 wherein the spaghetti-like extrudate shapes are dried, marumerized to form spheres, contacted with solvent to extract the polymer, dried and calcined to form gamma alumina spheres, which (a) when the spheres range from about 1/50 inch up to about 1/25 inch particle size diameter, are characterized as follows:

| | |
|---|---|
| Surface Area, m²/g | 200–500 |
| Pore Volume, cc/g | 0.5–1.5 |
| Pore Size Distributions, cc/g | |
| 100–200A | >0.3 |
| 200–400A | >0.05 |
| 400A+ | <0.2 |
| 1000A+ | <0.1 | and (b) when the spheres range from about 1/25 inch up to about ⅛ inch particle size diameter, they are characterized as follows:

| | |
|---|---|
| Surface Area, m²/g | 200–500 |
| Pore Volume, cc/g | 0.7–1.7 |
| Pore Size Distributions, cc/g | |
| 100–200A | >0.3 |
| 200–400A | >0.05 |
| 400A+ | <0.2 |
| 1000A+ | <0.1 |

11. The process of claim 10 wherein (a) when the spheres range from about 1/50 inch up to about 1/25 inch particle size diameter, they are characterized as follows:

| | |
|---|---|
| Surface Area, m²/g | 225–325 |
| Pore Volume, cc/g | 0.7–1.1 |
| Pore Size Distributions, cc/g | |
| 100–200A | >0.4 |
| 200–400A | >0.1 |
| 400A+ | <0.1 |
| 1000A+ | <0.05 | and (b) when the spheres range from about 1/25 inch up to about ⅛ inch particle size diameter, are characterized as follows:

| | |
|---|---|
| Surface Area, m²/g | 250–350 |
| Pore Volume, cc/g | 0.8–1.3 |
| Pore Size Distributions, cc/g | |
| 100–200A | >0.4 |
| 200–400A | >0.1 |
| 400A+ | <0.1 |

| | |
|---|---|
| 1000A+ | <0.05 |

12. The process of claim 10 wherein the Group VIB or VIII metal, or both, is composited with the dried, calcined gamma alumina spheres.

13. The process of claim 1 wherein the alumina hydrogel is precipitated by combining solutions (a) a first of which contains an alkali metal aluminate and (b) a second of which contains a strong mineral acid or an aluminum salt of a strong mineral acid, the anion portion of which is soluble in the alkaline solution.

14. The process of claim 1 wherein silica is added to the solution.

15. The process of claim 1 wherein the temperature of precipitation ranges from about 32° F to about 70° F.

16. The process of claim 1 wherein the concentration of alumina contained within the solution ranges from about 2 to about 3 percent, based on the weight of the solution.

17. The process of claim 1 wherein the pH of the solution ranges from about 9 to about 10.

18. The process of claim 1 wherein the precipitated alumina hydrogel is washed at ambient temperature.

19. The process of claim 1 wherein the hydrogel is washed at temperatures ranging from about 70° F to about 85° F.

20. The process of claim 1 wherein the water soluble polymer contains from about 4 to about 8 monomer units in the total molecule.

21. The process of claim 1 wherein the polymer displaces water from the pores of the alumina hydrogel until the weight ratio of polymer:alumina within the hydrogel ranges from about 1:1 to about 2:1.

22. The process of claim 1 wherein the polymer containing alumina hydrogel is spray dried at air temperatures ranging from about 250° to about 350° F to form the boehmite, the temperature of the boehmite per se being maintained below about 250° F.

23. The process of claim 22 wherein the polymer containing alumina hydrogel is spray dried at air temperatures ranging from about 275° to about 300° F.

24. The process of claim 22 wherein the boehmite is formed as a granulated solid of average particle size diameter ranging from about 75 to about 125 microns.

25. The process of claim 22 wherein, after the spray drying step, granulated boehmite is formed, and water is added back to the boehmite to form an extrudable homogeneous paste.

26. The process of claim 25 wherein the extrudable homogeneous paste contains from about 26 to about 32 weight percent alumina.

27. The process of claim 25 wherein the granulated boehmite paste is extruded by applying a torque ranging from about 40 inch-pounds to about 50 inch-pounds, the solids content of the extrudable homogeneous paste is controlled, and the relationship between the solids content of the paste, extrudate diameter and the average spherical size diameter of the spherical particles to be ultimately formed from extrudates are as follows:

| Solids Content of the Paste, Wt. % | Extrudate Diameter, Inches | Average Sphere Size Diameter, Inches |
|---|---|---|
| 30–32 | 1/55–1/28 | 1/50–1/25 |
| 28–30 | 1/32–1/21 | 1/25–[1/6] 1/16 |
| 26–28 | 1/24–1/12 | 1/16–1/8 |

28. The process of claim 27 wherein the spheres are dried, calcined to form gamma alumina and the Group VIB or VIII metal, or both, is composited with the gamma alumina spheres.

29. The process of claim 28 wherein (a) when the spheres range from about 1/50 inch up to about 1/25 inch particle size diameter, they are characterized as follows:

| | |
|---|---|
| Surface Area, m²/g | 200–500 |
| Pore Volume, cc/g | 0.5–1.5 |
| Pore Size Distributions, cc/g | |
| 100–200A | >0.3 |
| 200–400A | >0.05 |
| 400A+ | <0.2 |
| 1000A+ | <0.1 | and (b) when the spheres range from about 1/25 inch up to about ⅛ inch particle size diameter, are characterized as follows:

| | |
|---|---|
| Surface Area, m²/g | 200–500 |
| Pore Volume, cc/g | 0.7–1.7 |
| Pore Size Distributions, cc/g | |
| 100–200A | >0.3 |
| 200–400A | >0.05 |
| 400A+ | <0.2 |
| 1000A+ | <0.1 |

30. The process of claim 28 wherein (a) when the spheres range from about 1/50 inch up to about 1/25 inch particle size diameter, they are characterized as follows:

| | |
|---|---|
| Surface Area, m²/g | 225–325 |
| Pore Volume, cc/g | 0.7–1.1 |
| Pore Size Distributions, cc/g | |
| 100–200A | >0.4 |
| 200–400A | >0.1 |
| 400A+ | <0.1 |
| 1000A+ | <0.05 | and (b) when the spheres range from about 1/25 inch up to about ⅛ inch particle size diameter, are characterized as follows:

| | |
|---|---|
| Surface Area, m²/g | 250–350 |
| Pore Volume, cc/g | 0.8–1.3 |
| Pore Size Distributions, cc/g | |
| 100–200A | >0.4 |
| 200–400A | >0.1 |
| 400A+ | <0.1 |
| 1000A+ | <0.05 |

* * * * *